(12) United States Patent
Brown et al.

(10) Patent No.: US 7,746,347 B1
(45) Date of Patent: *Jun. 29, 2010

(54) METHODS AND SYSTEMS FOR PROCESSING A GEOMETRY SHADER PROGRAM DEVELOPED IN A HIGH-LEVEL SHADING LANGUAGE

(75) Inventors: Patrick R. Brown, Raleigh, NC (US); Barthold B. Lichtenbelt, Fort Collins, CO (US); Christopher T. Dodd, Woodside, CA (US); Mark J. Kilgard, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 560 days.

This patent is subject to a terminal disclaimer.

(21) Appl. No.: 11/565,566

(22) Filed: Nov. 30, 2006

Related U.S. Application Data

(63) Continuation-in-part of application No. 10/883,893, filed on Jul. 2, 2004, now Pat. No. 7,426,724.

(60) Provisional application No. 60/833,978, filed on Jul. 28, 2006.

(51) Int. Cl.
*G06F 15/16* (2006.01)
*G06F 9/30* (2006.01)
*G06F 9/44* (2006.01)
*G06F 9/45* (2006.01)
*G06T 15/00* (2006.01)
*G06T 15/50* (2006.01)

(52) U.S. Cl. ............... 345/522; 345/426; 345/503; 717/114; 717/151; 717/153; 712/200; 712/203

(58) Field of Classification Search ................ 345/418, 345/426, 501, 506, 522, 556, 503, 520; 717/100, 717/106, 14, 151, 153, 114, 149, 124, 119; 712/203–208, 200, 220, 227, 244
See application file for complete search history.

(56) References Cited

U.S. PATENT DOCUMENTS 5,005,137 A * 4/1991 Ernst .......................... 709/246
5,109,481 A    4/1992 Lathrop et al.

(Continued)

OTHER PUBLICATIONS

William et al. "Cg: A System for Programming Graphics Hardware in a C-like Language", ACM Transactions on Graphics (TOG), vol. 22 No. 3, Jul. 2003, pp. 896-907.

(Continued)

*Primary Examiner*—Wesner Sajous
(74) *Attorney, Agent, or Firm*—Patterson & Sheridan, LLP

(57) ABSTRACT

Methods and systems for processing a geometry shader program developed in a high-level shading language are disclosed. Specifically, in one embodiment, after having received the geometry shader program configured to be executed by a first processing unit in a programmable execution environment, the high-level shading language instructions of the geometry shader program is converted into low-level programming language instructions. The low-level programming language instructions are then linked with the low-level programming language instructions of a domain-specific shader program, which is configured to be executed by a second processing unit also residing in the programmable execution environment. The linked instructions of the geometry shader program are directed to the first processing unit, and the linked instructions of the domain-specific shader program are directed to the second processing unit.

25 Claims, 6 Drawing Sheets

U.S. PATENT DOCUMENTS

| | | | |
|---|---|---|---|
| 5,465,224 | A | 11/1995 | Guttag et al. |
| 5,594,854 | A | 1/1997 | Baldwin et al. |
| 5,798,770 | A | 8/1998 | Baldwin |
| 5,812,854 | A * | 9/1998 | Steinmetz et al. ............ 717/159 |
| 5,870,097 | A | 2/1999 | Snyder et al. |
| 5,977,977 | A | 11/1999 | Kajiya et al. |
| 6,044,225 | A * | 3/2000 | Spencer et al. ................ 710/52 |
| 6,269,384 | B1 | 7/2001 | Oberman |
| 6,342,892 | B1 | 1/2002 | Van Hook et al. |
| 6,370,558 | B1 | 4/2002 | Guttag et al. |
| 6,578,197 | B1 * | 6/2003 | Peercy et al. ................ 717/143 |
| 6,891,544 | B2 * | 5/2005 | Oka et al. .................... 345/545 |
| 6,952,206 | B1 * | 10/2005 | Craighead ................... 345/422 |
| 6,972,769 | B1 | 12/2005 | Nebeker et al. |
| 6,982,718 | B2 | 1/2006 | Kilgard et al. |
| 6,983,456 | B2 * | 1/2006 | Poznanovic et al. ......... 717/133 |
| 7,006,101 | B1 | 2/2006 | Brown et al. |
| 7,009,615 | B1 | 3/2006 | Kilgard et al. |
| 7,015,915 | B1 * | 3/2006 | Diard .......................... 345/522 |
| 7,426,724 | B2 * | 9/2008 | Kilgard et al. .............. 717/151 |
| 2001/0010051 | A1 | 7/2001 | Oberman et al. |
| 2001/0034876 | A1 | 10/2001 | Panchul et al. |
| 2002/0080143 | A1 | 6/2002 | Morgan et al. |
| 2002/0082081 | A1 | 6/2002 | Takeuchi |
| 2003/0020741 | A1 * | 1/2003 | Boland et al. ............... 345/700 |
| 2003/0080963 | A1 | 5/2003 | Van Hook et al. |
| 2003/0105793 | A1 | 6/2003 | Guttag et al. |
| 2004/0003370 | A1 | 1/2004 | Schenk et al. |
| 2004/0012563 | A1 | 1/2004 | Papakipos et al. |
| 2004/0012596 | A1 * | 1/2004 | Allen et al. ................. 345/501 |
| 2004/0012600 | A1 | 1/2004 | Deering et al. |
| 2004/0158693 | A1 | 8/2004 | Dagan et al. |
| 2004/0169671 | A1 * | 9/2004 | Aronson et al. ............. 345/700 |
| 2004/0183451 | A1 | 9/2004 | D'Amora |
| 2005/0243094 | A1 | 11/2005 | Patel et al. |
| 2006/0114260 | A1 * | 6/2006 | Diard .......................... 345/505 |

OTHER PUBLICATIONS

Fernando et al. "The Cg Tutorial: The Definitive Guide to Programmable Real-Time Graphics", Addison-Wesley, 2003, 104 pages.

Kessenich, et al., 2003, "The OpenGL Shading Language", 112 pages, downloaded from http://www.opengl.org/documentation/oglsl.html.

Kolb, et al., "Hardware-based simulation and collision detection for large particle systems", Proceedings of the ACM Siggraph/Eurographics Conference on Graphics Hardware, Aug. 29-30, 2004, HWWS '04, ACM, NY, NY, pp. 123-131.

Akeley et al., "ARB_vertex_program", Version: Last Modified May 1, 2003, Revision 42, pp. 1-82, http://www.nvidia.com/dev_contenUnvopenglspecs/GL_ARB_vertex_program.txt.

Beretta et al., "ARB_fragment_program", Revision 24, Jan. 10, 2003, 55 pages, http://www.nvidia.com/dev_contenUnvopenglspecs/GL_ARB_fragment_program.txt.

Pat Brown et al., "Nv vertex_program2", NVIDIA Corporation, Last Modified May 16, 2004, NVIDIA Revision 32, pp. 1-44, http://www.nvidia.com/dev_contenUnvopenglspecs/GL_NV_vertex_program2.txt.

Pat Brown, NV_vertex_program3, NVIDIA Corporation, Last Modified Date May 17, 2004, NVIDIA Revision 1, pp. 1-12, http://www.nvidia.com/dev_contenUnvopenglspecs/GL_NV_vertex_program3.txt.

Brown et al., GL_NV_fragment_program, Revision 73, May 24, 2005, 51 pages, http://www.nvidia.com/dev_contenUnvopengispecs/GL_NV_fragment_program.txt.

Brown et al. GL_NV_fragment_program2, Revision 6, May 17, 2004, 12 pages, http://www.nvidia.com/dev_contenUnvopenglspecs/Gl NV fragment_program2.txt.

Hao, et al. 2001. Variable-precision rendering. In Proceedings of the 2001 Symposium on interactive 3D Graphics 130 '01. ACM, New York, NY, pp. 149-158, http://portal.acm.org/citation.cfm?id=364338.364384.

Mark J. Kilgard, NV_texture_rectangle, NVIDIA Corporation, No. 229, Mar. 5, 2004, pp. 1-15, http://www.opengl.org/registry/specs/Nv/texture_rectangle.txt.

Mark J. Kilgard, "NvVIDIA OpenGL 2.0 Support", NVIDIA Corporation, Apr. 26, 2005, pp. 1-22, http://http.download.nvidia.com/developer/Papers/2005/OpenGL_2.0/NVIDIA_OpenGL_2.0_Support.pdf.

Mark J. Kilgard, NV_vertex_program, NVIDIA Corporation, Version 1.9, Feb. 24, 2004, pp. 1-49, http://www.nvidia.com/dev_contenUnvopenglspecs/GL_NV_vertex_program.txt.

Lefohn, et al., "Interactive Deformation and Visualization of Level Set Surfaces Using Graphics Hardware", Proceedings of the 14th IEEE Visualization 2003 (Vis'03), Oct. 22-24, 2003, IEEE Visualization. IEEE Computer Society, 11, pp. 75-82, http://portal.acm.org/citation.cfm?id=1 081432.1 081455.

A. Lovesey, "A Comparison of Real Time Graphical Shading Languages", University of New Brunswick Canada, CS4983 Senior Technical Report, Mar. 26, 2005, 70 pages, http://scholargoogle.com/scholar?cluster=1158069024545843559&h1=en&as_sdt=2001.

Olano, et al. 1998. A shading language on graphics hardware: the pixelflow shading system. In Proceedings of the 25th Annual Conference on Computer Graphics and interactive Techniques SIGGRAPH '98. ACM, New York, NY, pp. 159-168, http://portaLacm.org/citation.cfm?id=280814.280857&type=series.

Olano, et al., "Real-Time Shading: SIGGRAPH 2004 Course 1 Notes". Proceedings of the 25th Annual Conference on Computer Graphics and interactive Techniques Siggraph 2004, Aug. 24, 2004, ACM, New York, NY, 238 pages, http://portal.acm.org/citation.cfm?id=1103900.1103901.

Purnomo, et al. 2005. "Hardware-compatible vertex compression using quantization and simplification", In Proceedings of the ACM SIGGRAPH/EUROGRAPHICS Conference on Graphics Hardware (Los Angeles, California, Jul. 30 - 31, 2005). HWWS '05. ACRM, New York, NY, pp. 53-61, http://portal.acm.org/citation.cfm?id=107.

Wei, L. 2004. "Tile-based texture mapping on graphics hardware", in Proceedings of the ACM SIGGRAPH/EUROGRAPHICS Conference on Graphics Hardware (Grenoble, France, Aug. 29 - 30, 2004). HWWS '04. ACM, New York, NY, pp. 55-63, http://portal.acm.org/citation.cfm?id=1058129.1058138.

Office Action, Ser. No. 11/565,555, dated Dec. 7, 2009.

Office Action, Ser. No. 11/565,543, dated Dec. 10, 2009.

* cited by examiner

METHODS AND SYSTEMS FOR PROCESSING A GEOMETRY SHADER PROGRAM DEVELOPED IN A HIGH-LEVEL SHADING LANGUAGE

CROSS-REFERENCE TO RELATED APPLICATIONS

The current application claims the benefit of U.S. Provisional Application No. 60/833,978, filed on Jul. 28, 2006 and having the title, "API Extensions for Advanced Graphics Processing Units." This related application is hereby incorporated by reference in its entirety. The current application also is a continuation-in-part of U.S. application Ser. No. 10/883,893, filed on Jul. 2, 2004 now U.S. Pat. No. 7,426,724 and having the title, "Optimized Chaining of Vertex and Fragment Programs." This additional related application is also hereby incorporated by reference in its entirety.

BACKGROUND OF THE INVENTION

1. Field of the Invention

Embodiments of the present invention relate generally to graphics processing and more specifically to processing of a geometry shader program developed in a level-high shading language.

2. Description of the Related Art

Over the past decade, the cost of adding on-chip logic to processors has substantially decreased. Consequently, certain types of processors, such as advanced graphics processing units (GPUs), now include functionality not previously available in earlier GPU designs. For example, the newest GPUs are now able to perform geometry processing operations; whereas, such operations traditionally had been left to the central processing unit (CPU). One benefit of this shift in responsibilities is that more graphics processing may now be performed on the GPU instead of the CPU, thereby reducing performance bottlenecks in the graphics pipeline.

To fully realize additional processing capabilities of advanced GPUs, as much GPU functionality as possible needs to be exposed to application developers. Among other things, doing so enables application developers to tailor their shader programs to optimize the way GPUs process graphics scenes and images. Exposing new GPU processing capabilities, like geometry processing, to application developers requires that the application programming interface ("API") be configured with new calls and libraries that make new features and functionalities directly accessible by developers.

FIG. 1 is a conceptual diagram illustrating a prior art programming model, 100, availing the processing capabilities of a GPU, 106, to application 102. GPU 106 is typically configured to read and operate on a stream of input elements as those elements flow through graphics rendering pipeline 108. Graphics rendering pipeline 108 includes a series of processing units, each configured to carry out different functions of rendering pipeline 108, where the output of one processing unit is the input to the next processing unit in the chain. Some processing units shown in programming model 100 are programmable, such as vertex processing unit 130 and fragment processing unit 136, and are capable of executing one or more instances of compiled shading programs in parallel. Other processing units perform fixed functions, such as a fixed-function primitive assembler 132, a fixed-function geometry processor 133, and a rasterizer 134.

With GPU driver 104 supporting compiler 114, GPU microcode assembler 116, and GPU microcode assembler 118, specialized application 102, such as vertex shader program 110 or fragment shader program 112, can be written in a high-level shading language (e.g., the High Level Shader Language for Direct3D or the OpenGL™ Shading Language) tailored to one of these programmable processing units. Vertex shader program 110 is generally constructed using unified program instructions and with self-contained variables and functions. Likewise, fragment shader program 112 is constructed using unified program instructions and also with self-contained variables and functions. Compiler 114 optionally translates these high-level shading programs into distinct software objects of vertex shader assembly code 116 and fragment shader assembly code 118. Based on the translated assembly code, GPU microcode assemblers 120 and 122 then generate vertex shader microcode 124 and fragment shader microcode 126, respectively, for GPU 106. It should be noted that compiler 114 may reside outside of GPU driver 104 in other prior art programming models.

One drawback of the aforementioned programming model 100 is the lack of programmability for certain components in rendering pipeline 108. For instance, since rendering pipeline 108 lacks a programmable processing unit in between vertex processing unit 130 and fragment processing unit 136, application 102 is unable to manipulate or process the output data of vertex processor unit 130 until that data reaches fragment processing unit 136. Another drawback of programming model 100 is the potential inefficiencies relating to developing and deploying separate domain-specific shader programs, because application developers need to rationalize the various shader programs they develop.

As the foregoing illustrates, what is needed in the art is a programming model that exposes new programmability and processing capabilities of GPUs, such as the ability to program and perform geometry processing operations, and enables efficient development of the various shader programs that execute within the different domains of the rendering pipeline.

SUMMARY OF THE INVENTION

Methods and systems for processing a geometry shader program developed in a high-level shading language are disclosed. Specifically, in one embodiment, after having received the geometry shader program configured to be executed by a first processing unit in a programmable execution environment, the high-level shading language instructions of the geometry shader program are converted into low-level programming language instructions. The low-level programming language instructions are then linked with the low-level programming language instructions of a domain-specific shader program, which is configured to be executed by a second processing unit also residing in the programmable execution environment. The linked instructions of the geometry shader program are directed to the first processing unit, and the microcode instructions of the domain-specific shader program are directed to the second processing unit.

One advantage of the disclosed methods and systems is that a geometry shader program or other domain-specific shader programs can be efficiently developed using a high-level shading language for programmable processing units in a rendering pipeline.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Methods and systems for processing a geometry shader program developed in a high-level shading language are described. In the following description, for the purposes of explanation, numerous specific details are set forth in order to provide a thorough understanding of the present invention. It will be apparent, however, to one skilled in the art that the present invention may be practiced without these specific details.

Figure 2:
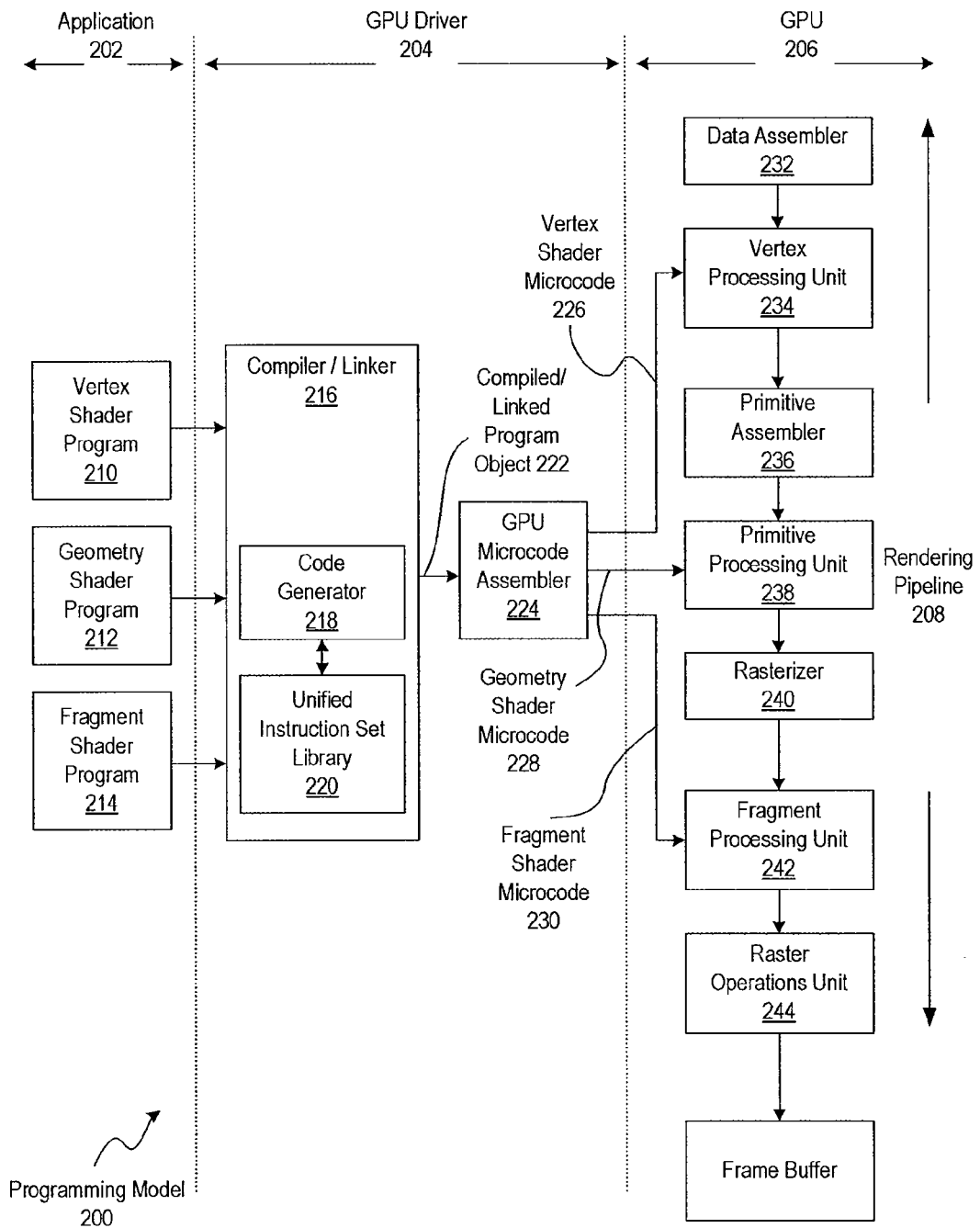
FIG. 2 is a conceptual diagram illustrating a programming model, according to one embodiment of the present invention.

Throughout this disclosure, a "domain-specific" shader program generally refers to a shader program specifically constructed to operate in a particular stage in a rendering pipeline. For instance, vertex shader program 210 shown in FIG. 2 is executed during the vertex processing stage of rendering pipeline 208. Likewise, geometry shader program 212 is executed during the primitive processing stage, and fragment shader program 214 is executed during the fragment processing stage. A "shader program" broadly refers to a software program that operates on the individual elements in a stream of elements. A "shader engine," on the other hand, refers to a programmable processing unit which performs the processes defined in a shader program. Thus, primitive processing unit 238 of FIG. 2 is a shader engine, because it is configured to perform the processes defined in geometry shader program 212. Some examples of the types of elements that may be operated on by a shader program include, without limitation, vertices, pixels, and fragments. "Varying variables" provide the interface between a vertex shader and a geometry shader and also between a geometry shader and a fragment shader. A "low-level programming language" generally refers to a programming language that provides little or no abstraction from a processing unit. Some examples of this low-level programming language include, without limitation, assembly code and microcode. Also, some examples of the "computer-readable medium" referred herein include, without limitation, volatile memory and non-volatile storage media (e.g., optical or magnetic disks).

FIG. 2 is a conceptual diagram illustrating a programming model, 200, according to one embodiment of the present invention. Under programming model 200, domain-specific shader programs, such as vertex shader program 210, geometry shader program 212, and fragment shader program 214, are written in a high-level shading language, such as the OpenGL™ ES Shading Language ("ESSL") or the OpenGL™ Shading Language ("GLSL"); these domain-specific shader programs are developed using a common instruction set, supported by unified instruction set library 220. With the common instruction set, application developers can construct shader programs in different domains using a core set of instructions having the same syntax and consequently should expect faster compile times for such shader programs.

Figure 1:
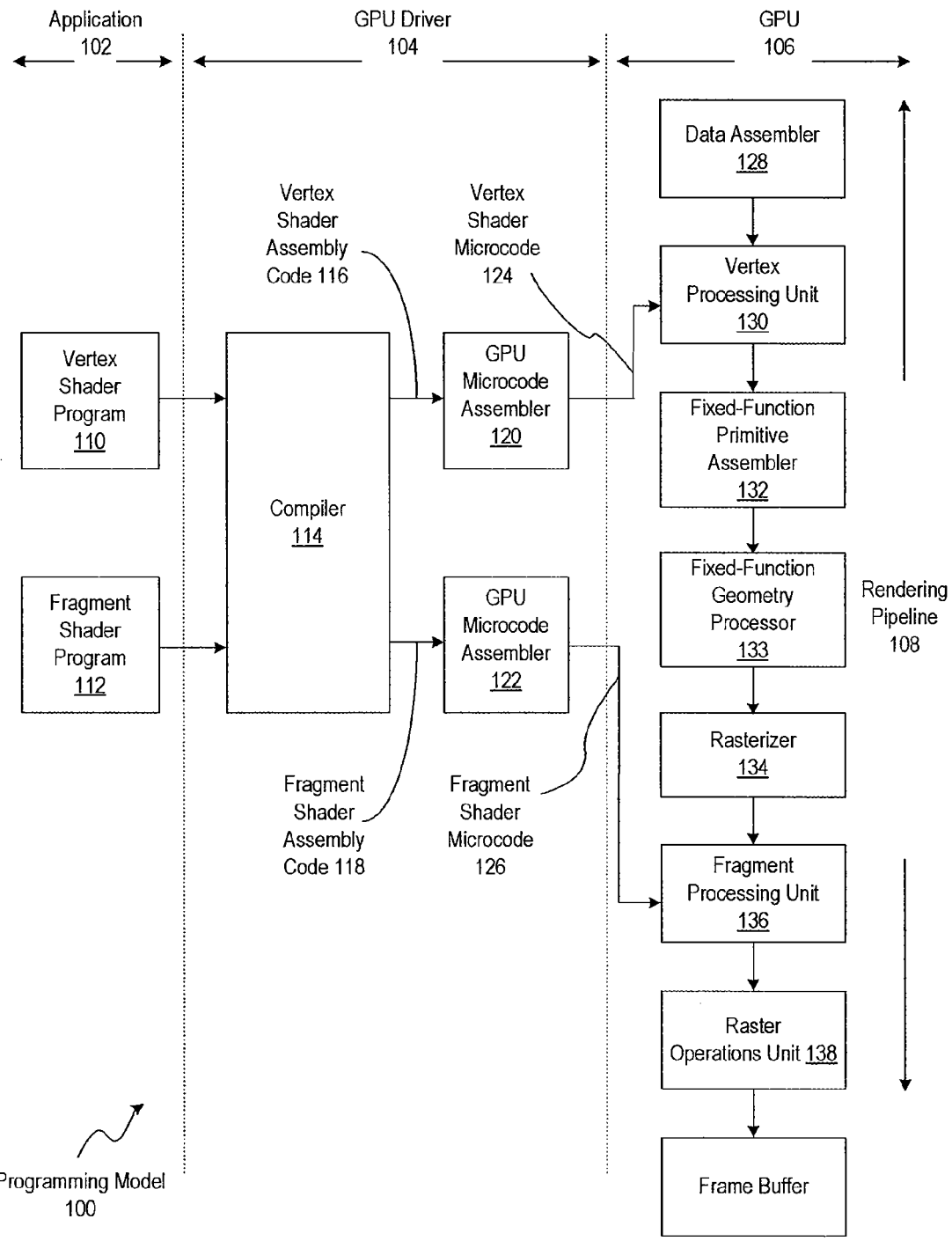
FIG. 1 is a conceptual diagram illustrating a prior art programming model availing the processing capabilities of a GPU to applications.

Moreover, in programming model 200, GPU driver 204, which is the device driver for GPU 206, supports compiler/linker 216. Compiler/linker 216, which includes code generator 218 and unified instruction set library 220, provides cross-domain linking capabilities. Specifically, compiler/linker 216 translates the shader programs designated for different domains (e.g., vertex shader program 210, geometry shader program 212, and fragment shader program 214), which are written in high-level shading language, into distinct compiled software objects in the form of assembly code. Further, instead of sending these compiled objects of assembly code individually to separate GPU microcode assemblers as shown in FIG. 1, compiler/linker 216 also "links" the compiled assembly code to generate a collection of up to three separate chunks of assembly code with the inputs/outputs of each chunk lined up as described below. This collection is referred to as compiled/linked program object 222. To link multiple compiled objects from different domains (also referred to as to "rendezvous"), compiler/linker 216 needs to reconcile the use of symbols across the domains. Specifically, there are generally two types of symbols, the first type being defined or exported symbols, and the second type being undefined or imported symbols. The first type of symbols broadly refers to functions or variables that are present in one compiled object (e.g., vertex shader assembly code) and should be made available for use by other compiled objects (e.g., geometry shader assembly code and/or fragment shader assembly code). The second type of symbols broadly refers to functions or variables that are called or referenced by one compiled object (e.g., vertex shader assembly code) but are not internally defined within this compiled object. The compiler/linker 216 and optimizations related to linking shader programs for concurrent execution are discussed in greater detail in the patent application titled, "Optimized Chaining of Vertex and Fragment Programs," filed on Jul. 2, 2004 and having U.S. patent application Ser. No. 10/883,893. The subject matter of this patent application is hereby incorporated by reference in its entirety.

Additionally, compiler/linker 216 supports two types of linking, linking by name and linking by semantics. To illustrate linking by name, suppose Color is the name of a variable containing color values to be passed from the vertex shader program to the fragment shader program. Suppose also that Color is defined in this vertex shader program. In programming model 200, compiler/linker 216 facilitates the establishment and maintenance of the input/output relationship between vertex shader program 210 and, for example, geometry shader program 212 without requiring any explicit variables-to-hardware mappings in the shader programs, so long as the two shader programs use the name Color consistently. To link by semantics, on the other hand, the variable names are not required to be the same. Suppose vertex shader program 210 declares a variable with the name of Vertex_Color for storing the color type X to be passed to geometry shader program 212, and geometry shader program 212 declares a variable with the name of Geometry_Color for receiving the color type X. In this scenario, compiler/linker 216 is still capable of establishing and maintaining the input/output relationship between vertex shader program 210 and geometry shader program 212, so long as Vertex_Color and Geometry_Color are assigned the same semantics corresponding to the color type X. Alternatively, instead of explicitly assigning semantics as discussed above, for GLSL, well-defined names corresponding to specific semantic meaning, such as gl_TexCoord[0] corresponding to texture coordinate zero and gl_FrontColor corresponding to a front-facing color value, are utilized to interface not only with other GLSL shaders, but also with OpenGL fixed-function processing or separate programs written in assembly code.

In addition to cross-domain linking, compiler/linker 216 also supports error reporting and optimization capabilities. Using the "linking by name" example above, if geometry shader program 212 uses a different variable name than Color, then compiler/linker 216 is configured to generate a linking error to indicate the inconsistent usage of the variable name. In addition, if Color were declared in a different manner in geometry shader program 212 than in vertex shader program 210, for example, then a linking error would occur. If the input of geometry shader program 212 does not have a corresponding output, a linking error would also occur. This error reporting mechanism enables application developers to efficiently identify any programming mistakes and as a result improve the robustness of their programs. Also, compiler/linker 216 searches for and removes programming inefficiencies across domains. For example, suppose vertex shader program 210 generates multiple output variables destined for geometry shader program 212. Compiler/linker 216 is capable of identifying the output variables that are not used by geometry shader program 212 and then excluding these unused output variables from compiled/linked program object 222.

Further details about compiler/linker 218 may be found in the patent application having Ser. No. 10/883,893 previously referred to herein. Compiled/linked program object 222 generated by compiler/linker 218 is optionally directed to a single GPU microcode assembler 224, which generates three software objects of domain-specific microcode for GPU 206 to execute: vertex shader microcode 226, derived from vertex shader program 210, geometry shader microcode 228, derived from geometry shader program 212, and fragment shader microcode 230, derived from fragment shader program 214. GPU microcode assembler 224 further directs each of these three objects of microcode to an appropriate programmable processing unit. More particularly, GPU microcode assembler 224 directs vertex shader microcode 226, geometry shader microcode 228, and fragment shader microcode 230 to vertex processing unit 234, primitive processing unit 238, and fragment processing unit 242, respectively. Vertex shader microcode 226 executes on vertex processing unit 234 to process the attributes of the received vertex typically associated with a geometric primitive. Similarly, fragment shader microcode 230 also executes on fragment processing unit 242 to process fragment data, which may include raster position, depth or interpolated vertex attributes, such as texture coordinates, opacity, and other relevant per-pixel data, to produce final pixel values. It should be apparent to a person with ordinary skill in the art that the various examples given above relating to compiler/linker 216 are for illustrative purposes only and should not be construed to limit the scope of the claimed invention.

Figure 3A:
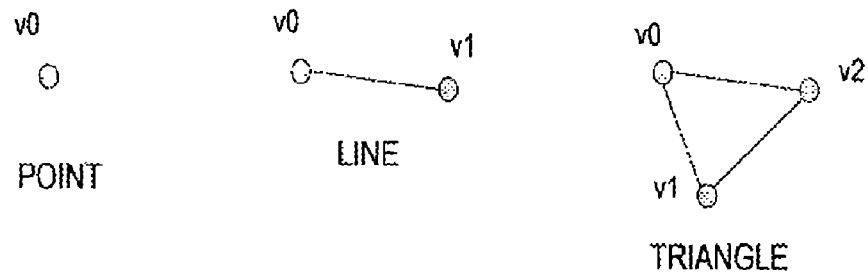
FIG. 3A illustrates types of input geometric primitives that can be specified for a geometry shader program, according to one embodiment of the present invention.
Figure 3A:
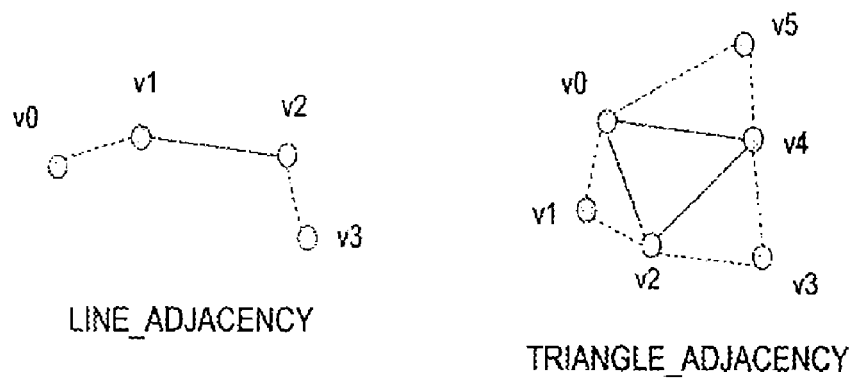
Figure 3B:
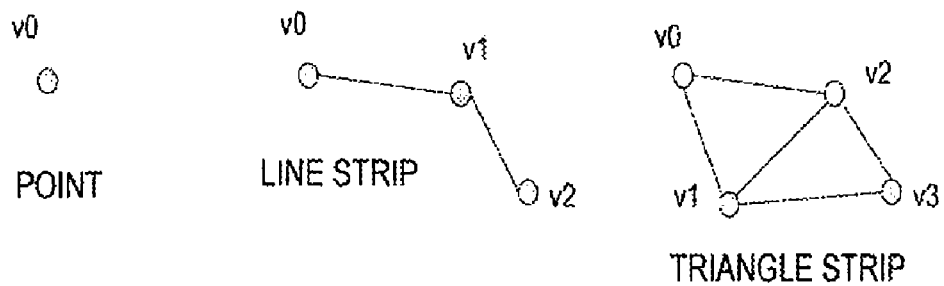
FIG. 3B illustrates types of output geometric primitives that can be specified for a geometry shader program, according to one embodiment of the present invention.

As also shown in FIG. 2 and previously mentioned herein, another programmable processing unit in rendering pipeline 208 includes a programmable primitive processing unit, 238, which can be configured to execute geometry shader microcode 228. Execution of geometry shader microcode 228 generally takes place after the transformation of vertices but prior to color clamping and flat shading and clipping. As discussed above, geometry shader microcode 228 is derived from geometry shader program 212, which broadly refers to a program developed in a high-level shading language to operate on geometric primitives. In one implementation, geometry shader program 212 accepts geometric primitives such as points, lines, triangles, lines with adjacent vertices, and triangles with adjacent vertices shown in FIG. 3A as input and generates new geometric primitives such as points, line strips, or triangle strips shown in FIG. 3B as output. Geometry shader program 212 is capable of receiving a set of vertices making up the input geometric primitive, reading the attributes of any of these received vertices, and "emitting" zero or more vertices making up the output geometric primitive. Geometry shader program 212 can even emit vertices making up multiple disconnected geometric primitives. To "emit" a vertex, geometry shader program 212 collects all the output values, places the collected data in a packet, and transmits the packet as one vertex with certain attributes. A detailed description supporting the processing of the different input and output primitive types by a geometry shader program is set forth below in the next section of the present application.

Figure 4:
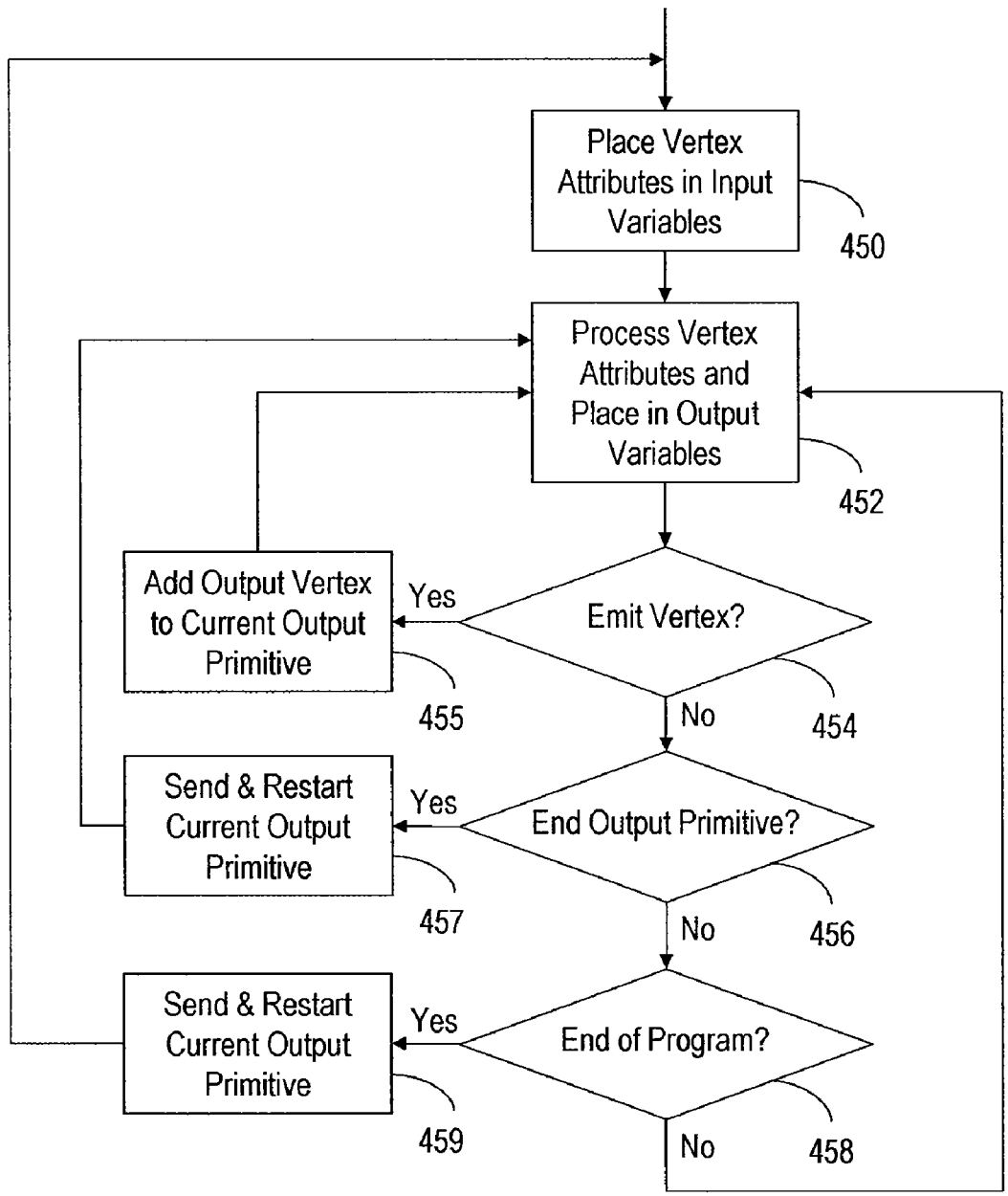
FIG. 4 is a simplified flow diagram illustrating the operations that a primitive processing unit is configured to perform based on a geometry shader program, according to one embodiment of the present invention.

FIG. 4 is a simplified flow diagram illustrating the operations that primitive processing unit 238 is configured to perform based on geometry shader program 212. Suppose geometry shader program 212 is also written as follows:

```
void main (void)
{
   vec4 vertOut;
   vec4 colorOut;
   int i;
   for (i=0; i<gl_VerticesIn; ++i)
   {
      vertOut=gl_PositionIn[i];
      colorOut=gl_FrontColorIn[i];
      //Do some processing with vertOut and colorOut
      gl_FrontColor=colorOut;
      gl_Position=vertOut;
      EmitVertex( );
   }
}
```

Before a geometry shader program is invoked, the type of its input geometric primitive and the type of its output geometric primitive need to be declared. For the example shown above, suppose the input type is declared to be any of the geometric primitives shown in FIG. 3A and the output type is declared to be a set of points. In step 450, the vertex attributes of an input geometric primitive are placed in input variables such as gl_PositionIn and gl_FrontColorIn. It should be noted that gl_PositionIn and gl_FrontColorIn are arrays of size <N>, where N is the number of vertices in the input geometric primitive type. Also, these two arrays are both pre-declared across multiple domains. Alternatively, instead of reading from these pre-declared variables, the vertex attributes may be read from input varying variables declared with the "varying in" qualifier. Because geometry shader program 212 is written to operate on geometric primitives (i.e., potentially a collection of vertices), the built-in variables, like gl_PositionIn and gl_FrontColorIn, are pre-declared as arrays, and user-defined variables (using "varying in") are also declared as arrays. In step 452, the vertex attributes (e.g., coordinates and colors) are processed and the results are written to the output variables such as gl_FrontColor and gl_Position. Alternatively, the results may be written to output varying variables declared with the "varying out" qualifiers.

Step 454 determines when all the output values have been collected, and the collected data are written out as a vertex with its attributes in step 455. In one implementation, EmitVertex( ) is called to specify the completion of processing on this vertex and to add this vertex to the current output geometric primitive. Step 456 determines if a geometry shader has requested to terminate its current primitive, built up from the vertices emitted in step 455. If so, step 457 sends the current primitive to rasterizer 240 and starts a new empty primitive of the same type. In one implementation, EndPrimitive( ) is called in step 456 to specify the end of the current primitive. Step 458 identifies the end of the geometry shader execution. When the geometry shader finishes, as in step 457, the current primitive is sent to the rasterizer 240 in step 459 and a new geometry shader may be invoked with new input vertices. EndPrimitive( ) does not need to be called under certain conditions. One condition is if the declared output type for geometry shader program 212 is a point, and the other condition is if geometry shader program 212 generates only a single output geometric primitive.

Figure 5:
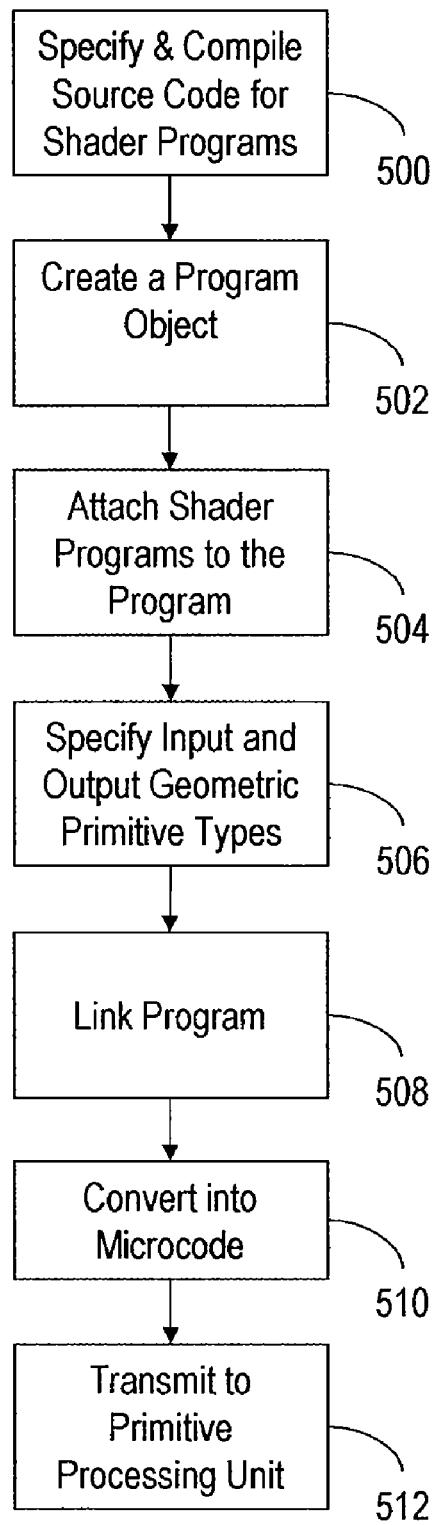
FIG. 5 is a simplified flow diagram illustrating one process of compiling, linking, and executing a geometry shader program, according to one embodiment of the present invention.

FIG. 5 is a simplified flow diagram illustrating one process of compiling, linking, and executing geometry shader program 212, according to one embodiment of the present invention. In one implementation, this process is implemented in application 202, which makes use of a set of commands supported by the OpenGL API to invoke any of the domain-specific shader programs. Specifically, in step 500, source code for each of the shader programs to be invoked is specified and compiled. Thus, for geometry shader program 212, the source code like the one discussed in conjunction with FIG. 4 above would be specified in this step. In addition, a call to compiler/linker 216 to compile the source code is also made. Then, a program object designated as a container for all the compiled shader programs is created in step 502. Initially, this container program would be empty. Then in step 504, the compiled shader programs are attached to the container program. Before proceeding to link the compiled shader programs, the input and output geometric primitive types for geometry shader program 212 are declared in step 506. Then a call to compiler/linker 216 to link this container program is made in step 508. Then the linked output of step 508 is converted to microcode in step 510 before the microcode is sent to primitive processing unit 238 in step 512. Other relevant features of geometry shader program 212 are further described below in the next section of the present application.

Figure 6:
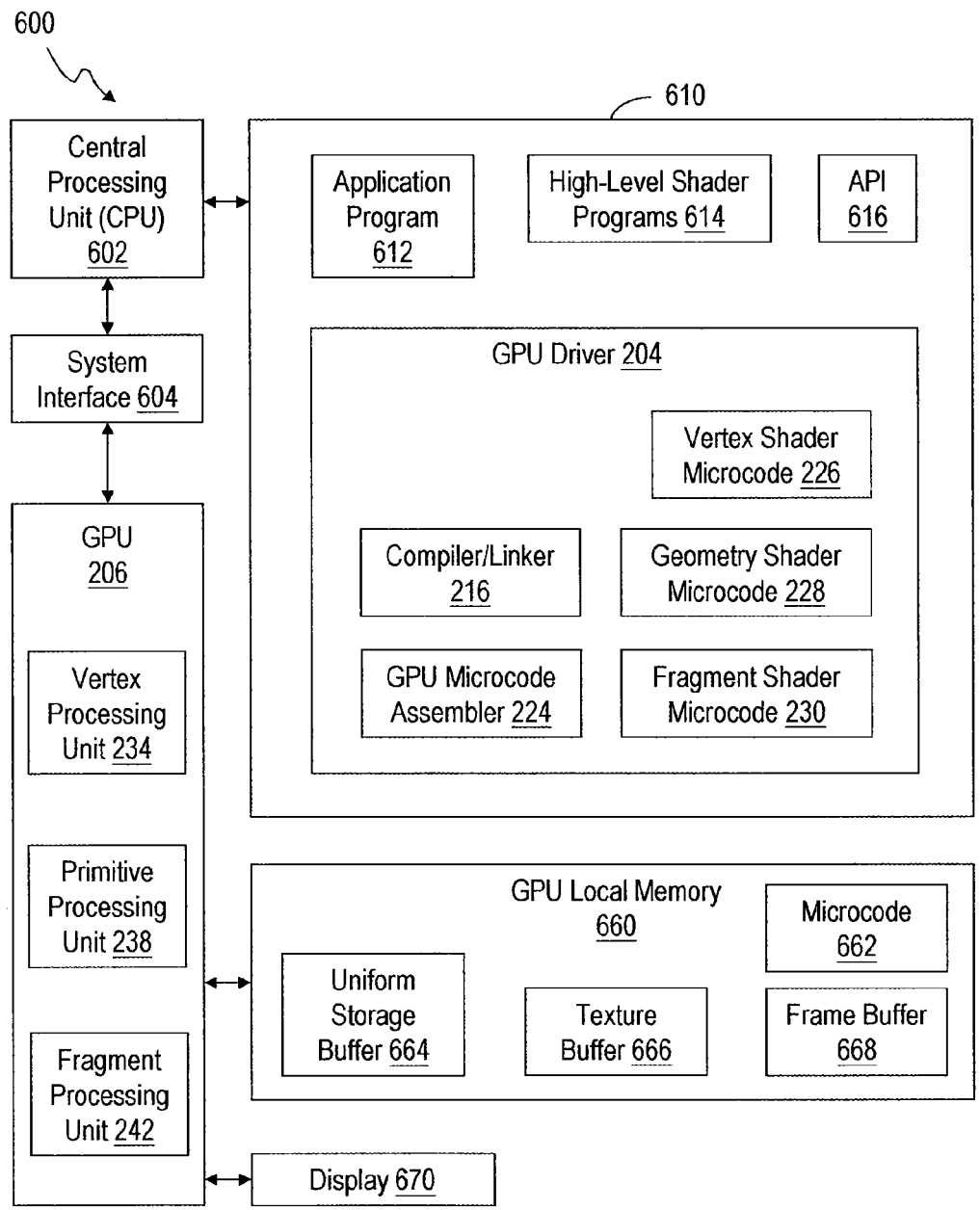
FIG. 6 is a conceptual diagram of a computing device configured to implement one or more embodiments of the present invention.

FIG. 6 is a conceptual diagram of a computing device 600 configured to implement one or more aspects of the present invention. The computing device 600 includes a central processing unit (CPU) 602, a system interface 604, a system memory 610, GPU 206 as shown in FIG. 2, a GPU local memory 660 and a display 670. CPU 602 connects to system memory 610 and system interface 604. CPU 602 executes programming instructions stored in system memory 610, operates on data stored in system memory 610, and communicates with GPU 206 through the system interface 604, which bridges communication between CPU 602 and GPU 206. In alternate embodiments, CPU 602, GPU 206, system interface 604, or any combination thereof, may be integrated into a single processing unit. Further, the functionality of GPU 206 may be included in a chipset or in some other type of special purpose processing unit or co-processor. System memory 610 stores programming instructions and data for processing by CPU 602. System memory 610 typically includes dynamic random access memory (DRAM) configured to either connect directly to CPU 602 (as shown) or alternately, via system interface 604. GPU 206 receives instructions transmitted by CPU 602 and processes the instructions in order to render graphics data and images stored in GPU local memory 660. GPU 206 displays certain graphics images stored in GPU local memory 660 on the display 670.

System memory 610 includes an application program 612, one or more high-level shader programs 614, such as vertex shader program 210, geometry shader program 212, and fragment shader program 214 shown in FIG. 2, an API 616, and GPU driver 204 as shown in FIG. 2. Application program 612 generates calls to the API 616 in order to produce a desired set of results, typically in the form of a sequence of graphics images. Application program 612 also transmits one or more high-level shading programs 614 to API 616 for processing within GPU driver 204. The high-level shading programs are typically source code text of high-level programming instructions that are designed to operate on one or more shaders within GPU 206. In one implementation, the source code text is written in GLSL, and API 616 is the OpenGL™ API. GPU driver 204 includes compiler/linker 216, GPU microcode assembler 224, vertex shader microcode 226, geometry shader microcode 228, and fragment shader microcode 228 as shown in FIG. 2 and discussed above.

GPU driver 204 transmits the aforementioned microcode shader programs to GPU local memory 660 to be stored as microcode 662. In addition, GPU local memory 660 also includes a uniform storage buffer 664, a texture buffer 666, and a frame buffer 668. Uniform storage buffer 664 stores one or more uniform variables, also called "uniforms." A uniform variable is held constant during a given invocation of the associated shader but may be altered between invocations. Texture buffer 666 stores data elements typically organized in one-dimensional, two-dimensional or three-dimensional structures. Frame buffer 668 includes at least one two-dimensional surface that is used to drive display 670.

GPU 206 includes vertex processing unit 234, primitive processing unit 238, and fragment processing unit 242 as discussed above. The execution of microcode 662 (e.g., vertex shader microcode 226, geometry shader microcode 228, and fragment shader microcode 230) on the programmable processing units (e.g., vertex processing unit 234, primitive processing unit 238, and fragment processing unit 240) imparts specific processing behavior according to specific requirements and specifications of application program 612.

Display 670 is an output device capable of emitting a visual image corresponding to an input data signal. For example, the display may be built using a cathode ray tube (CRT) monitor, a liquid crystal display, or any other suitable display system. The input data signal to display 670 is typically generated by scanning out the contents of one or more frames of image data that is stored in frame buffer 668.

The Geometry Shader Extensions

Extensions to the OpenGL Shading Language (GLSL) and related APIs to support a geometry shader are discussed in this section. Persons skilled in the art will appreciate that the information in this section should be considered in conjunction with the current OpenGL 2.0™ specification.

Input Primitives

A geometry shader can operate on one of five input primitive types. Depending on the input primitive type, one to six vertices are available when the shader is executed. Each input primitive type supports a subset of the primitives provided by the GL. If a geometry shader is active, Begin, or any function that implicitly calls Begin, will produce an INVALID_OPERATION error if the <mode> parameter is incompatible with the input primitive type of the currently active program object, as discussed below.

The input primitive type is a parameter of the program object, and must be set before linking by calling ProgramParameteriNV with <pname> set to GEOMETRY_INPUT_TYPE_NV and <value> set to one of POINTS, LINES, LINES_ADJACENCY_NV, TRIANGLES or TRIANGLES_ADJACENCY_NV. This setting will not be in effect until the next time LinkProgram has been called successfully. Note that queries of GEOMETRY_INPUT_TYPE_NV will return the last value set. This is not necessarily the value used to generate the executable code in the program object. After a program object has been created it will have a default value for GEOMETRY_INPUT_TYPE_NV.

The supported input primitive types are: (1) POINTS: Geometry shaders that operate on points are valid only for the POINTS primitive type. There is only a single vertex available for each geometry shader invocation; (2) LINES: Geometry shaders that operate on line segments are valid only for the LINES, LINE_STRIP, and LINE_LOOP primitive types. There are two vertices available for each geometry shader invocation. The first vertex refers to the vertex at the beginning of the line segment and the second vertex refers to the vertex at the end of the line segment; (3) LINES_ADJACENCY_NV: Geometry shaders that operate on line segments with adjacent vertices are valid only for the LINES_ADJACENCY_NV and LINE_STRIP_ADJACENCY_NV primitive types. There are four vertices available for each program invocation. The second vertex refers to attributes of the vertex at the beginning of the line segment and the third vertex refers to the vertex at the end of the line segment. The first and fourth vertices refer to the vertices adjacent to the beginning and end of the line segment, respectively; (4) TRIANGLES: Geometry shaders that operate on triangles are valid for the TRIANGLES, TRIANGLE_STRIP, TRIANGLE_FAN, QUADS, QUAD_STRIP, and POLYGON primitive types. For QUADS, QUAD_STRIP, and POLYGON primitives, individual polygons are decomposed into one or more triangles, where the orientation of each triangle is consistent with the orientation of the original primitive. For such primitives, the shader is executed once for each triangle in the decomposition. There are three vertices available for each program invocation. The first, second and third vertices refer to attributes of the first, second and third vertex of the triangle, respectively; and (5) TRIANGLES_ADJACENCY_NV: Geometry shaders that operate on triangles with adjacent vertices are valid for the TRIANGLES_ADJACENCY_NV and TRIANGLE_STRIP_ADJACENCY_NV primitive types. There are six vertices available for each program invocation. The first, third, and fifth vertices refer to the first, second, and third vertices of the triangle. The second, fourth, and sixth vertices refer to adjacent vertices on the other side of the triangle edge connecting the neighboring vertices.

Output Primitives

A geometry shader can generate primitives of one of three types. The supported output primitive types are points (POINTS), line strips (LINE_STRIP), and triangle strips (TRIANGLE_STRIP). The vertices output by the geometry shader are decomposed into points, lines, or triangles based on the output primitive type. If the number of vertices emitted by the geometry shader is not sufficient to produce a single primitive, nothing is drawn.

The output primitive type is a parameter of the program object, and can be set by calling ProgramParameteriNV with <pname> set to GEOMETRY_OUTPUT_TYPE_NV and <value> set to one of POINTS, LINE_STRIP or TRIANGLE_STRIP. This setting will not be in effect until the next time LinkProgram has been called successfully.

Variables in General

Geometry shaders can access the transformed attributes of all vertices for its input primitive type through input varying variables. A vertex shader, writing to output varying variables, generates the values of these input varying variables. This includes values for built-in as well as user-defined varying variables. Values for any varying variables that are not written by a vertex shader are undefined. Additionally, a geometry shader has access to a built-in variable that holds the ID of the current primitive. This ID is generated by the primitive assembly stage that sits in between the vertex and geometry shader.

Additionally, geometry shaders can write to one, or more, varying variables for each primitive it outputs. These values are flat shaded (if enabled) and clipped, then the clipped values interpolated across the primitive (if not flat shaded). The results of these interpolations are available to a fragment shader, if one is active. Furthermore, geometry shaders can write to a set of built-in varying variables, defined in the OpenGL Shading Language, that correspond to the values required for the fixed-function processing that occurs after geometry processing.

Input Variables

The OpenGL Shading Language specification describes the set of built-in variables that are available as inputs to the geometry shader. This set receives the values from the equivalent built-in output variables written by the vertex shader. These built-in variables are arrays; each element in the array holds the value for a specific vertex of the input primitive. The length of each array depends on the value of the input primitive type, as determined by the program object value GEOMETRY_INPUT_TYPE_NV, and is set by the GL during link. Each built-in variable is a one-dimensional array, except for the built-in texture coordinate variable, which is a two-dimensional array. The vertex shader built-in output gl_TexCoord[ ] is a one-dimensional array. Therefore, the geometry shader equivalent input variable gl_TexCoordIn[ ][ ] becomes a two-dimensional array.

Some examples of the built-in variables include: (1) gl_FrontColorIn[ ], gl_BackColorIn[ ], gl_FrontSecondaryColorIn[ ] and gl_BackSecondaryColorIn[ ] hold the per-vertex front and back colors of the primary and secondary colors, as written by the vertex shader to its equivalent built-in output variables; (2) gl_TexCoordIn[ ][ ] holds the per-vertex values of the array of texture coordinates, as written by the vertex shader to its built-in output array gl_TexCoord[ ]; (3) gl_FogFragCoordIn[ ] holds the per-vertex fog coordinate, as written by the vertex shader to its built-in output variable gl_FogFragCoord; (4) gl_PositionIn[ ] holds the per-vertex position, as written by the vertex shader to its output variable gl_Position; (5) gl_ClipVertexIn[ ] holds the per-vertex position in clip coordinates, as written by the vertex shader to its output variable gl_ClipVertex; (5) gl_PointSizeIn[ ] holds the per-vertex point size written by the vertex shader to its built-in output varying variable gl_PointSize, even if the mode VERTEX_PROGRAM_POINT_SIZE is disabled; and (6) gl_PrimitiveIDIn is not an array and has no vertex shader equivalent. It is filled with the number of primitives processed since the last time Begin was called (directly or indirectly via vertex array functions).

Similarly to the built-in varying variables, user-defined input varying variables need to be declared as arrays. If no size (vertex count) is specified, it will be inferred by the linker from the input primitive type. If a size is specified, it has to be of the size matching the number of vertices of the input primitive type, otherwise a link error will occur. The built-in variable gl_VerticesIn, if so desired, can be used to size the array correctly for each input primitive type. User-defined varying variables can be declared as arrays in the vertex shader.

Output Variables

In one implementation, a geometry shader is limited in the number of vertices it may emit per invocation. Providing this limit allows the hardware to manage its internal buffers more efficiently. The maximum number of vertices a geometry shader can possibly emit needs to be set as a parameter of the program object that contains the geometry shader. This limit needs to be set before executing the geometry shader. To do so, call ProgramParameteriNV with <pname> set to GEOMETRY_VERTICES_OUT_NV and <value> set to the maximum number of vertices the geometry shader will emit in one invocation. There are two implementation-dependent limits on the value of GEOMETRY_VERTICES_OUT_NV. First, the total number of vertices may not exceed the value of MAX_GEOMETRY_OUTPUT_VERTICES_NV. Second, the product of the total number of vertices and the sum of all components of all active varying variables may not exceed the value of MAX_GEOMETRY_TOTAL_OUTPUT_COMPONENTS_NV. If it does, ProgramParameteriEXT will generate the error INVALID_VALUE.

A geometry shader can write to built-in as well as user-defined varying variables. These values are expected to be interpolated across the primitive it outputs, unless they are specified to be flat shaded. In order to seamlessly be able to insert or remove a geometry shader from a program object, the rules, names and types of the output built-in varying variables and user-defined varying variables are the same as for the vertex shader.

Some examples of the built-in output variables include:

(1) gl_FrontColor, gl_BackColor, gl_FrontSecondaryColor, and gl_BackSecondaryColor hold the front and back colors for the primary and secondary colors for the current vertex; (2) gl_TexCoord[ ] is an array and holds the set of texture coordinates for the current vertex; (3) gl_FogFragCoord is used as the "c" value, as described in section 3.10 "Fog" of the OpenGL 2.0 specification; (4) gl_Position is intended to hold the homogeneous vertex position; (5) gl_ClipVertex holds the vertex coordinate used in the clipping stage; (6) gl_PointSize, if written, holds the size of the point to be rasterized, measured in pixels; and (7) Additionally, a geometry shader can write to the built-in special variables gl_PrimitiveID and gl_Layer, whereas a vertex shader cannot. The built-in gl_PrimitiveID provides a single integer that serves as a primitive identifier. This written primitive ID is available to fragment shaders. If a fragment shader using primitive IDs is active and a geometry shader is also active, the geometry shader must write to gl_PrimitiveID or the primitive ID number seen by the fragment shader is undefined. The built-in variable gl_Layer is used in layered rendering.

More specifically, layered rendering allows an application to bind an entire "complex" texture to a framebuffer object, and render primitives to arbitrary layers computed at run time. For example, this mechanism can be used to project and render a scene onto all six faces of a cubemap texture in one pass. The layer to render to is specified by writing to the built-in output variable gl_Layer. Layered rendering requires the use of framebuffer objects. When a geometry shader using layered rendering is active, rasterizer 240 shown in FIG. 2 selects a provoking vertex from each point, line, or triangle emitted by the geometry shader. When rendering that primitive, the layer of the complex texture used is given by the value of gl_Layer for the provoking vertex.

Some Examples of the Functions Supported by the OpenGL™ API

The following are some functions, or otherwise referred to as commands, supported by the OpenGL™ API.

glCreateShader (GL_GEOMETRY_SHADER_NV); //Create a geometry shader object glCompileShader (geomShader); //compile to obtain assembly code glProgramParameteriNV (program, GL_GEOMETRY_INPUT_TYPE_NV, GL_TRIANGLES); //Specify the input type to be TRIANGLES glProgramParameteriNV (program, GL_GEOMETRY_OUTPUT_TYPE_NV, GL_POINTS); //Specify the output type to be POINTS glLinkProgram (program); //Perform linking The above description illustrates various embodiments of the present invention along with examples of how aspects of the present invention may be implemented. The above examples, embodiments, and drawings should not be deemed to be the only embodiments, and are presented to illustrate the flexibility and advantages of the present invention as defined by the following claims.

We claim:

1. A method for processing a geometry shader program in a programmable execution environment, the method comprising:

receiving the geometry shader program configured to be executed by a first processing unit in the programmable execution environment, wherein the geometry shader program includes instructions written in a high-level shading language;

converting the high-level shading language instructions of the geometry shader program into low-level programming language instructions;

linking the low-level programming language instructions of the geometry shader program with the low-level programming language instructions of a domain-specific shader program configured to be executed by a second processing unit in the programmable execution environment; and directing the linked instructions of the geometry shader program to the first processing unit and the linked instructions of the domain-specific shader program to the second processing unit.

2. The method of claim 1, wherein the linked instructions are linked assembly code instructions.

3. The method of claim 2, further comprising converting the linked assembly code instructions of the geometry shader program and the domain-specific shader program into microcode instructions that can be executed in the programmable execution environment.

4. The method of claim 1, further comprising specifying an input type of an input geometric primitive and an output type of an output geometric primitive for the geometry shader program prior to the linking step.

5. The method of claim 4, wherein the input type can be a point, a line, a triangle, a line with adjacent strip vertices, or a triangle with adjacent edge vertices.

6. The method of claim 4, wherein the output type can be a point, a line strip, or a triangle strip.

7. The method of claim 1, wherein the linking step further comprising specifying input/output relationship between the geometry shader program and the domain-specific shader program by symbol names.

8. The method of claim 1, wherein the linking step further comprising specifying input/output relationship between the geometry shader program and the domain-specific shader program by symbol semantics.

9. The method of claim 1, wherein the programmable execution environment is a graphics processing unit ("GPU").

10. The method of claim 1, wherein the high-level shading language is derived from the OpenGL™ Shading Language ("GLSL") or the OpenGL™ ES Shading Language ("ESSL").

11. The method of claim 1, further comprising manipulating the geometry shader program and the domain-specific program through a set of commands defined in a common application program interface ("API").

12. The method of claim 11, wherein the common API is derived from the OpenGL™ API.

13. The method of claim 10, wherein the high-level shading language includes a function capable of emitting a vertex.

14. The method of claim 13, wherein a first number of output vertices emitted differs from a second number of input vertices.

15. The method of claim 10, wherein the high-level shading language includes a function capable of restarting a primitive.

16. The method of claim 10, wherein the high-level shading language includes a built-in variable initialized to identify a primitive.

17. The method of claim 10, wherein the high-level shading language includes a built-in variable to indicate a framebuffer layer for an output primitive.

18. The method of claim 10, wherein the high-level shading language includes a built-in variable array initialized to store an array of input vertex attributes indexed by at least one vertex number.

19. The method of claim 10, wherein the high-level shading language includes a built-in variable to indicate the number of vertices in an input primitive.

20. The method of claim 12, wherein the common API includes a command designating an input type for an input geometric primitive for the geometry shader program to process.

21. The method of claim 12, wherein the common API includes a command designating an output type for an output geometric primitive for the geometry shader program to process.

22. The method of claim 21, wherein the common API further includes a command designating the input type involving adjacent vertices for the geometry shader program to process.

23. The method of claim 1, wherein the domain-specific shader program is a vertex shader program.

24. The method of claim 1, wherein the domain-specific shader program is a fragment shader program.

25. A computer-readable medium containing a sequence of instructions, which when executed by a processing unit in a system, causes the processing unit to:
- convert the high-level shading language instructions of a geometry shader program configured to be executed by a first shader engine in a graphics processing unit into low-level programming language instructions;
- link the low-level programming language instructions of the geometry shader program with the low-level programming language instructions of a domain-specific shader program configured to be executed by a second shader engine in the graphics processing unit; and
- direct the linked instructions of the geometry shader program to the first shader engine and the linked instructions of the domain-specific shader program to the second shader engine.

* * * * *